(12) United States Patent
Sakaguchi et al.

(10) Patent No.: US 10,736,256 B2
(45) Date of Patent: Aug. 11, 2020

(54) WORK VEHICLE AND DISPLAY CONTROL METHOD FOR WORK VEHICLE

(71) Applicant: Kubota Corporation, Osaka-shi (JP)

(72) Inventors: Kazuo Sakaguchi, Amagasaki (JP); Izuru Shimamoto, Amagasaki (JP); Kenji Tamatani, Amagasaki (JP); Megumi Suzukawa, Amagasaki (JP); Atsushi Shinkai, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 417 days.

(21) Appl. No.: 15/628,656

(22) Filed: Jun. 21, 2017

(65) Prior Publication Data

US 2018/0206389 A1 Jul. 26, 2018

(30) Foreign Application Priority Data

Jan. 20, 2017 (JP) ................................ 2017-008356

(51) Int. Cl.
*B60K 37/02* (2006.01)
*A01B 69/00* (2006.01)
(Continued)

(52) U.S. Cl.
CPC .......... *A01B 69/007* (2013.01); *A01B 69/008* (2013.01); *B60K 37/02* (2013.01);
(Continued)

(58) Field of Classification Search
CPC .... A01B 69/007; A01B 69/008; B60K 37/02; B60K 2370/11; B60K 2370/145; E02F 5/145; E02F 9/2025
(Continued)

(56) References Cited

U.S. PATENT DOCUMENTS 9,310,989 B2 * 4/2016 Dehmann .............. B60K 35/00
9,684,392 B2 * 6/2017 Kamiyama ......... G06F 3/03548
(Continued)

FOREIGN PATENT DOCUMENTS

CA 2402316 C * 11/2008 ......... H04N 21/4126
EP 2886507 6/2015
(Continued)

OTHER PUBLICATIONS

Anonymous, "Mid-Size Tractors, M7 Series, Kubota Tractor Corporation", Dec. 28, 2016, pp. 2-3, XP055394285, Retrieved from the Internet: URL: https://web.archive.org/web/20161228164436/http://www.kubota.com/product/MSeries/M7131.aspx, retrieved on Jul. 27, 2017.
(Continued)

*Primary Examiner* — Dale Moyer
(74) *Attorney, Agent, or Firm* — Mori & Ward, LLP

(57) ABSTRACT

A work vehicle includes a touch-panel display, at least one first physical button, and the circuitry. The touch-panel display is to display at least one first touch button, at least one first function, and work information. The at least one function is displayed in the at least one first touch button to which the at least one first function is assigned. The work information includes a state of work which the work vehicle performs. The at least one first physical button is provided outside the touch-panel display. The at least one first function is assigned to the at least one first physical button. The circuitry is configured to change the at least one first function assigned to the at least one first touch button and the at least one first physical button in accordance with the work information.

12 Claims, 12 Drawing Sheets

(51) Int. Cl.
*A01B 69/04* (2006.01)
*E02F 5/14* (2006.01)
*E02F 9/20* (2006.01)

(52) U.S. Cl.
CPC .......... *E02F 5/145* (2013.01); *B60K 2370/11* (2019.05); *B60K 2370/145* (2019.05); *E02F 9/2025* (2013.01)

(58) Field of Classification Search
USPC .......................................................... 701/50
See application file for complete search history.

(56) References Cited

U.S. PATENT DOCUMENTS

| | | | |
|---|---|---|---|
| 9,760,270 B2* | 9/2017 | Kubota | G06F 3/0488 |
| 9,841,293 B2* | 12/2017 | Nakayama | B60K 35/00 |
| 9,904,467 B2* | 2/2018 | Okita | G06F 3/0488 |
| 9,943,023 B2* | 4/2018 | Komatsu | A01B 71/02 |
| 9,976,286 B2* | 5/2018 | Seki | E02F 3/432 |
| 10,013,159 B2* | 7/2018 | Takahashi | G06F 3/04842 |
| 10,185,485 B2* | 1/2019 | Kuhn | G06F 3/0482 |
| 10,303,175 B2* | 5/2019 | Sakaguchi | G05D 1/0219 |
| 10,324,584 B2* | 6/2019 | Giacomini | G06F 3/04817 |
| 2005/0276448 A1* | 12/2005 | Pryor | B60K 35/00 382/103 |
| 2006/0017585 A1* | 1/2006 | Lenneman | B60K 35/00 340/691.6 |
| 2010/0259375 A1* | 10/2010 | Ferren | B60K 35/00 340/462 |
| 2011/0109555 A1* | 5/2011 | Miller | B60K 35/00 345/167 |
| 2014/0025263 A1* | 1/2014 | Geyer | B60K 35/00 701/49 |
| 2015/0169083 A1* | 6/2015 | Kim | G06F 3/038 345/184 |
| 2015/0210164 A1* | 7/2015 | Oh | B60K 37/06 200/1 R |
| 2015/0314683 A1* | 11/2015 | Toggweiler | G06F 3/04847 345/173 |
| 2016/0031447 A1 | 2/2016 | Kobayashi et al. | |
| 2016/0077652 A1* | 3/2016 | Yang | G06F 3/04886 345/174 |
| 2016/0077730 A1* | 3/2016 | Shim | B60K 35/00 715/773 |
| 2016/0103567 A1* | 4/2016 | Wengelnik | B60K 35/00 715/779 |
| 2016/0150020 A1* | 5/2016 | Farmer | B60K 35/00 455/420 |
| 2016/0200195 A1* | 7/2016 | Jun | B60K 35/00 715/765 |
| 2016/0240165 A1* | 8/2016 | Suzuki | G06F 1/1694 |
| 2016/0265196 A1* | 9/2016 | Shimizu | B60K 35/00 |
| 2016/0364029 A1* | 12/2016 | Miller | G06F 3/03547 |
| 2016/0373631 A1* | 12/2016 | Kocienda | H04N 5/23216 |
| 2017/0017392 A1* | 1/2017 | Castaneda | B66F 9/0759 |

FOREIGN PATENT DOCUMENTS

JP 2013-126829 6/2013
JP 2016-190552 11/2016

OTHER PUBLICATIONS

Anonymous, "Screen-labeled function keys—Wikipeda", Aug. 20, 2016, XP055394314. Retrieved from the Internet: URL: https://en.wikipedia.org/w/index.php?title=Screen-labeled_function_keys&oldid=735373349, retrieved on Jul. 27, 2017.

NCR, "I Am NCR RealPOS(TM) DynaKey(TM)", Apr. 5, 2015, XP055394312, Retrieved from the Internet: URL: https://web.archive.org/web/2015040506237if_/http://www.ncr.com/wp-content/uploads/rp_dynakey_ds.pdf, retrieved on Jul. 27, 2017.

Anonymous, "NCR RealPOS(TM) DynaKey—NCR", Sep. 28, 2015, XP055394311, Retrieved from the Internet: URL: https://web.archive.org/web/20150928233322/https://www.ncr.com/retail/food-drug-mass-merchandise/assisted-service-hardware/realposperipherals/ncr-realpos-dynakey, retrieved on Jul. 27, 2017.

Peter Chan, "android car dvd player setting steering wheel control function", Sep. 7, 2015, pp. 1-6, XP054979577, Retrieved from the Internet: URL: https://www.youtube.com/watch?v=Mvrb2-XHWBM, retrieved on Aug. 5, 2019.

Extended European Search Report for corresponding EP Application No. 17174788.4-1958, dated Aug. 8, 2017.

European Patent Office Communication for corresponding EP Application No. 17174788.4-1222, dated Aug. 16, 2019.

* cited by examiner

WORK VEHICLE AND DISPLAY CONTROL METHOD FOR WORK VEHICLE

CROSS-REFERENCE TO RELATED APPLICATIONS

The present application claims priority under 35 U.S.C. § 119 to Japanese Patent Application No. 2017-008356, filed Jan. 20, 2017. The contents of this application are incorporated herein by reference in their entirety.

BACKGROUND OF THE INVENTION

Field of the Invention

The present invention relates to a work vehicle and a display control method for a work vehicle.

Discussion of the Background

As the foregoing work vehicle, a work vehicle described in Japanese Patent Application Laid-open No. 2013-126829 is already known, for example. The work vehicle described in Patent Literature 1 is configured such that a work machine such as a cultivator or a loader is controlled based on information input to a touch-panel display ("work information monitor" in Japanese Patent Application Laid-open No. 2013-126829).

That is, an operator can operate a work device such as a cultivator or a loader by a touch input to a display.

SUMMARY OF THE INVENTION

According to one aspect of the present invention, a work vehicle includes a touch-panel display, at least one first physical button, and the circuitry. The touch-panel display is to display at least one first touch button, at least one first function, and work information. The at least one function is displayed in the at least one first touch button to which the at least one first function is assigned. The work information includes a state of work which the work vehicle performs. The at least one first physical button is provided outside the touch-panel display. The at least one first function is assigned to the at least one first physical button. The circuitry is configured to change the at least one first function assigned to the at least one first touch button and the at least one first physical button in accordance with the work information.

According to another aspect of the present invention, a display control method for a work vehicle, includes displaying at least one first touch button, at least one first function, and work information on a touch-panel display. The at least one first function is displayed in the at least one first touch button to which the at least one first function is assigned. The work information includes a state of work which the work vehicle performs. The at least one first function assigned to the at least one first touch button and at least first physical button which is provided outside the touch-panel display is changed in accordance with the work information.

According to further aspect of the present invention, a work vehicle includes a touch-panel display, at least one first physical button, and function changing means. The touch-panel display is to display at least one first touch button, at least one first function, and work information. The at least one function is displayed in the at least one first touch button to which the at least one first function is assigned. The work information includes a state of work which the work vehicle performs. The at least one first physical button is provided outside the touch-panel display. The at least one first function is assigned to the at least one first physical button. The function changing means are for changing the at least one first function assigned to the at least one first touch button and the at least one first physical button in accordance with the work information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
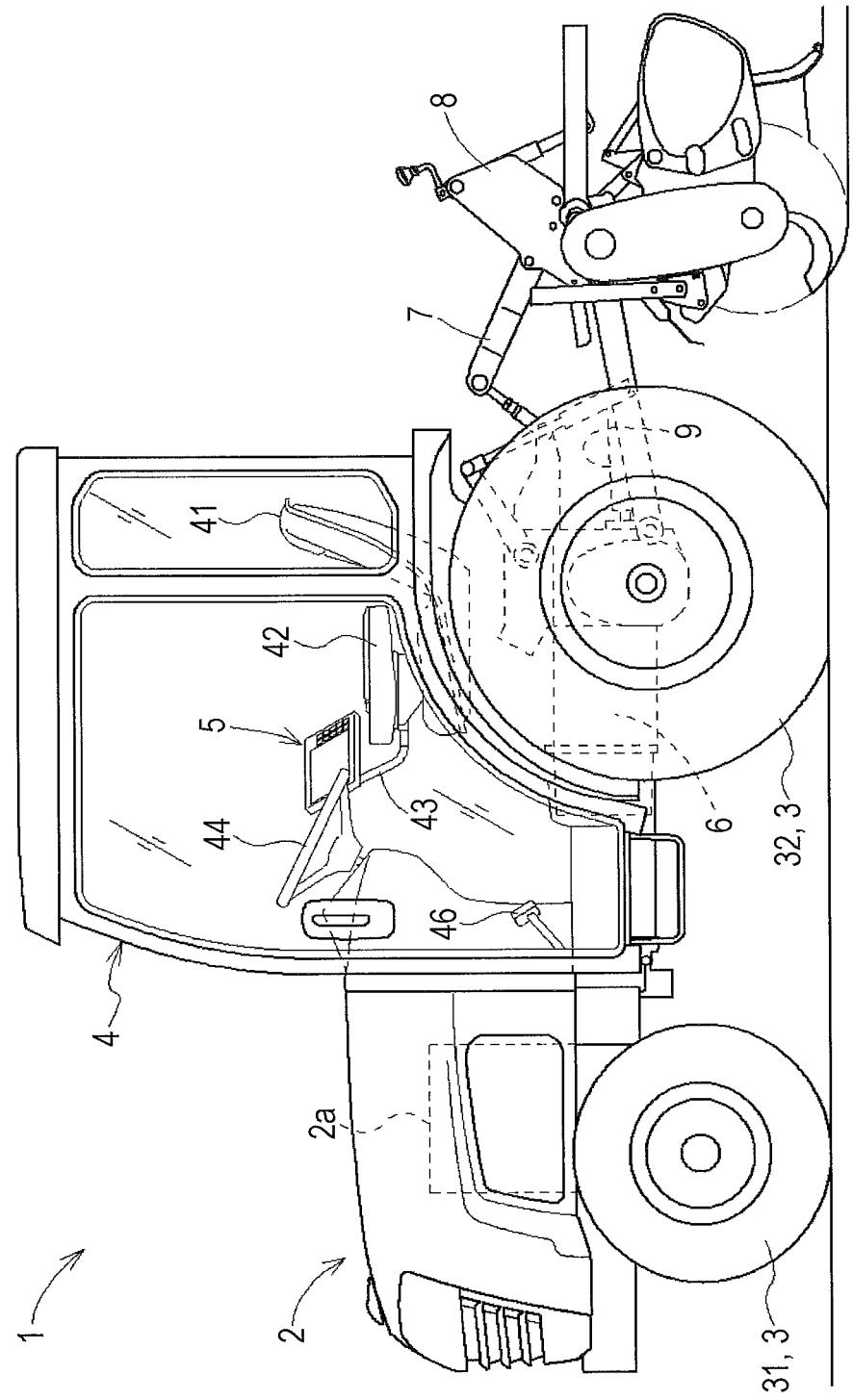
FIG. 1 is a left-side view of a tractor.

The embodiments will now be described with reference to the accompanying drawings, wherein like reference numerals designate corresponding or identical elements throughout the various drawings.

Embodiments for carrying out the present invention will be described with reference to the drawings. It is noted that unless specific statement is provided, a longitudinal direction in the following description will be referred to as follows. That is, a forward direction of travel of a machine body during work travel is "front", and a backward direction of travel of a machine body during work travel is "rear". Then, a direction corresponding to a right side with respect to a forward-facing orientation in a longitudinal direction is "right", and a direction corresponding to a left side is "left".

Also, in the description regarding FIGS. 3, 4, and 6 to 10, a rightward direction with respect to one who faces a paper sheet is "right, and a leftward direction with respect to one who faces a paper sheet is "left".

Overall Configuration of Tractor

FIG. 1 is a view showing a configuration of a tractor 1 which is one example of a work vehicle. The tractor 1 is configured so as to be capable of travelling and working by automatic driving.

As shown in FIG. 1, a prime mover part 2 is provided in a front portion of a machine body of the tractor 1. The prime mover part 2 includes an engine 2a. Also, the tractor 1 includes a wheel-type travel device 3. The travel device 3 includes a pair of right and left front wheels 31 and a pair of right and left rear wheels 32.

Motive power of the engine 2a is transmitted to the pair of right and left front wheels 31 and the pair of right and left rear wheels 32 via a main clutch (not shown) and a transmission 6. Then, the transmitted motive power drives the pair of right and left front wheels 31 and the pair of right and left rear wheels 32.

Figure 2:
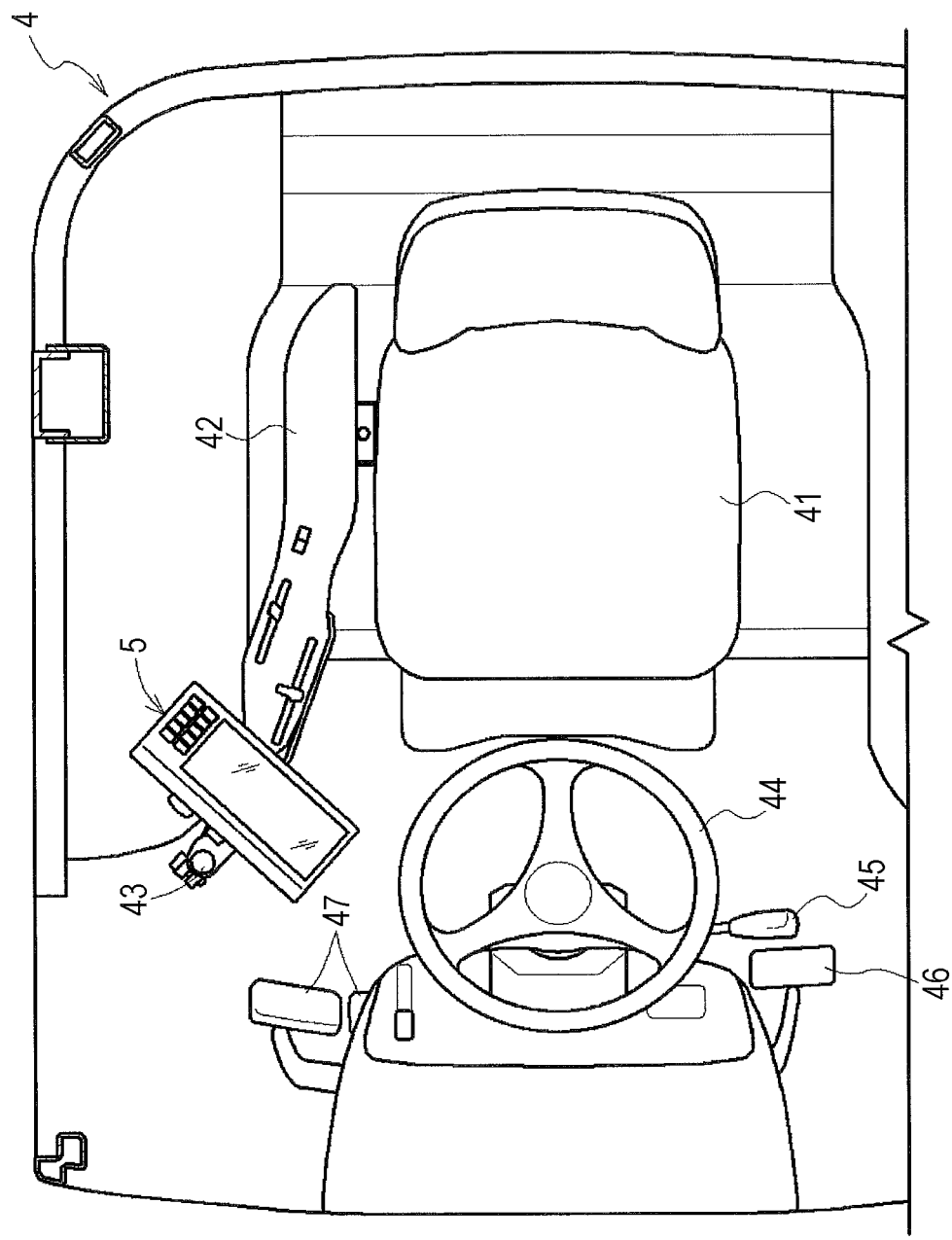
FIG. 2 is a plan view of a principal part when traversed, for showing a configuration of a cab part.

A cab part 4 is provided in the rear of the prime mover part 2. As shown in FIGS. 1 and 2, the cab part 4 includes a driver's seat 41, an arm rest 42, a supporting arm 43, a steering wheel 44, a shuttle lever 45, a clutch pedal 46, right and left brake pedals 47, and a terminal device 5. In the cab part 4, an operator can perform various driving operations manually.

As shown in FIGS. 1 and 2, the terminal device 5 is supported by the supporting arm 43. Also, an operator can perform a steering operation on the pair of right and left front wheels 31 by operating the steering wheel 44.

Also, an operator can switch the tractor 1 between forward movement and backward movement by operating the shuttle lever 45.

Also, an operator can perform an on/off operation of the main clutch by operating the clutch pedal 46.

Also, an operator can operate right and left side brakes by operating the right and left brake pedals 47.

As shown in FIG. 1, a cultivator 8 is attached to a rear portion of the tractor 1 via a lifting-up/down mechanism 7. Motive power of the engine 2a is transmitted to the cultivator 8 via a PTO shaft 9. Then, the transmitted motive power drives the cultivator 8.

The tractor 1 travels while driving the cultivator 8, so that work travel can be achieved.

Configuration of Terminal Device

Figure 3:
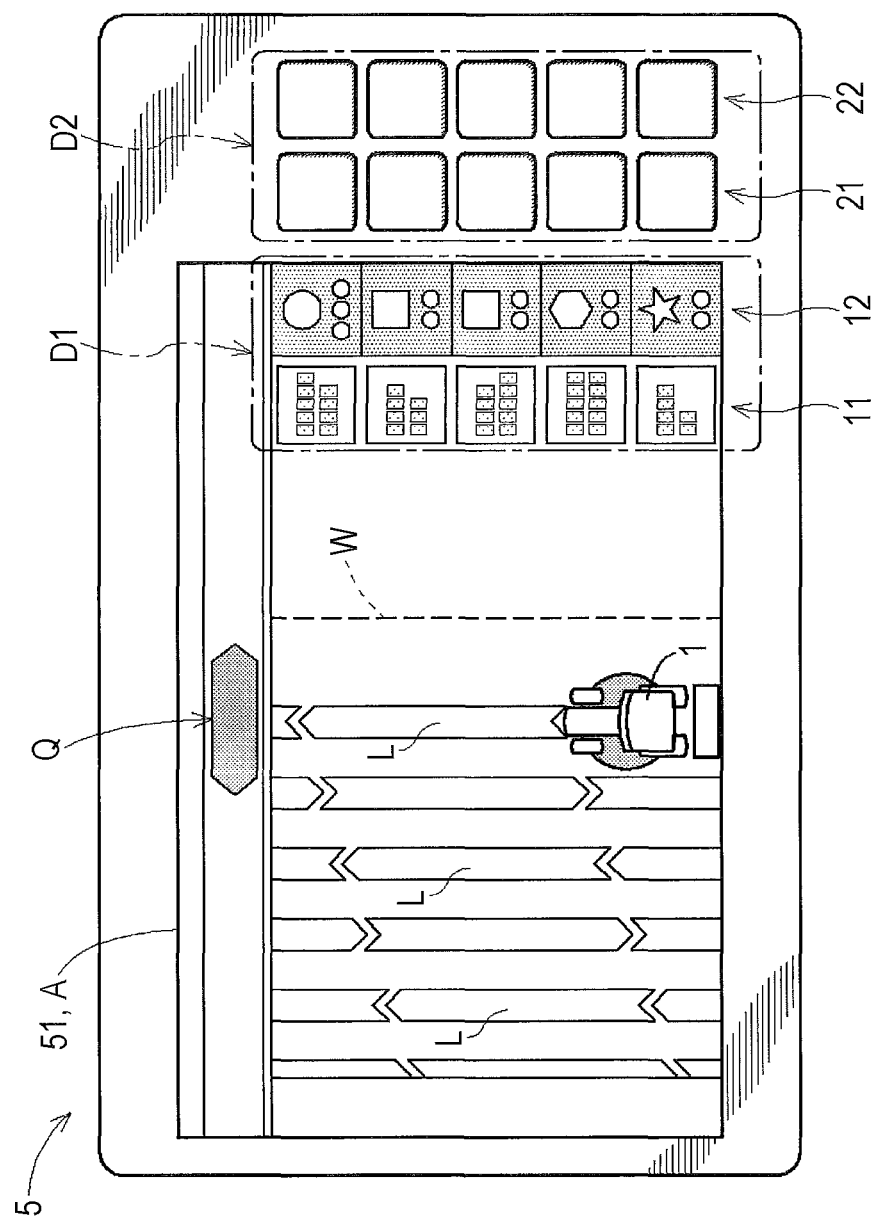
FIG. 3 is a view showing a configuration of a terminal device.
Figure 4:
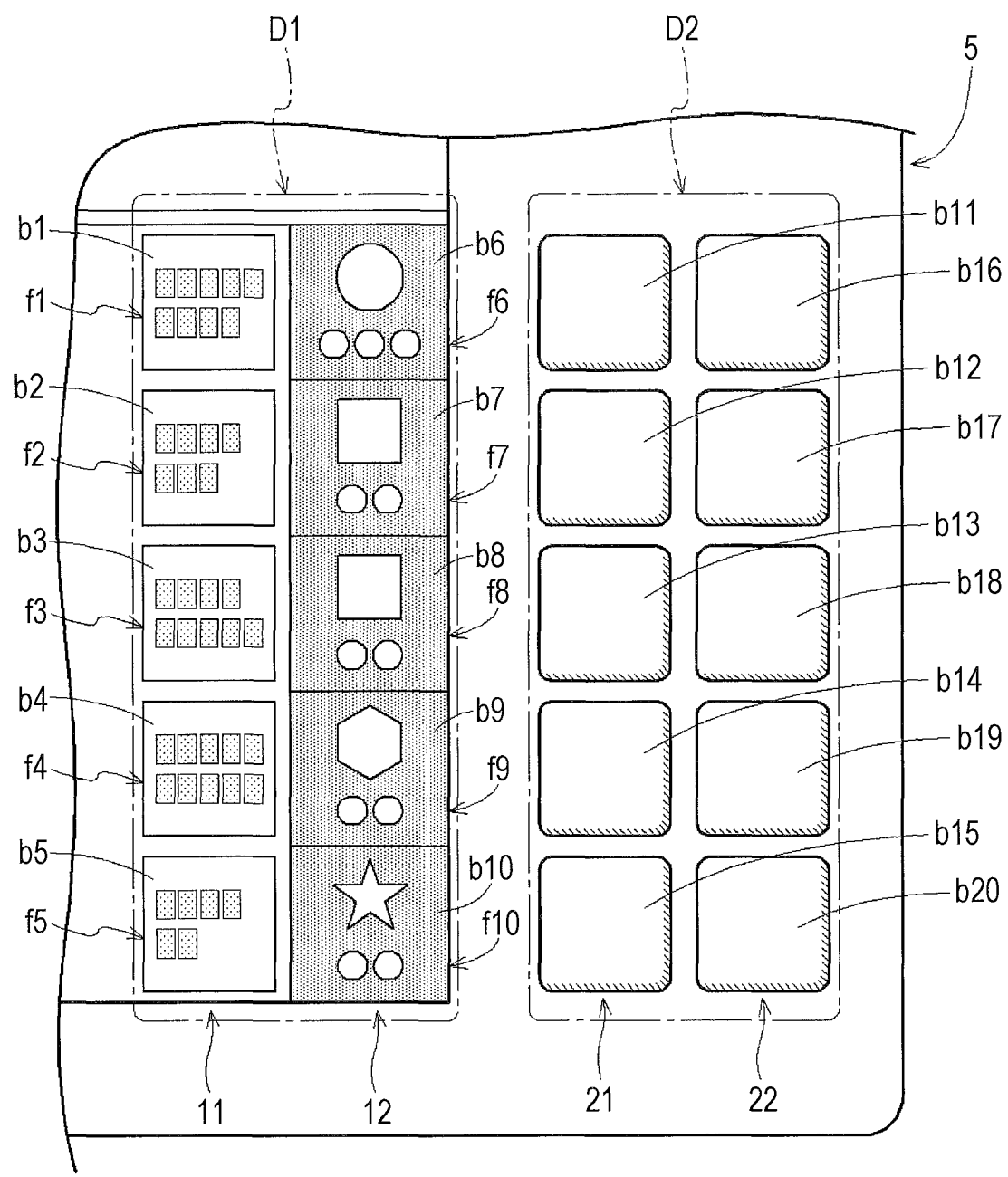
FIG. 4 is an enlarged view of a terminal device, for showing a configuration including a first touch button, a second touch button, a first physical button, and a second physical button.

FIGS. 3 and 4 are views showing the terminal device 5 during work travel which is performed by automatic driving. In this case, five first touch buttons 11 and five second touch buttons 12 each in vertical arrangement are displayed in a right end portion of a display 51 included in the terminal device 5. Different functions are assigned to the five first touch buttons 11 and the five second touch buttons 12, respectively.

Also, the display 51 is of a touch-panel type. An operator performs a touch operation on any one of the five first touch buttons 11 and the five second touch buttons 12, to thereby cause a function assigned to the one button being touched, to be fulfilled.

Also, work information which is information about work is displayed on the display 51. In an example shown in FIG. 3, as work information, a position of the tractor 1 in a work field W where work travel is performed, and a target travel route L in the work field W are displayed in a map form on the display 51.

As shown in FIGS. 3 and 4, the terminal device 5 includes five first physical buttons 21 and five second physical buttons 22 which are provided outside the display 51. The five first physical buttons 21 and the five second physical buttons 22 are provided each in vertical arrangement.

Different functions are assigned to the five first physical buttons 21 and the five second physical buttons 22, respectively. An operator presses any one of the five first physical buttons 21 and the five second physical buttons 22, to thereby cause a function assigned to the one button being pressed, to be fulfilled.

As shown in FIGS. 3 and 4, the five first touch buttons 11 include a first button b1, a second button b2, a third button b3, a fourth button b4, and a fifth button b5. Also, the five second touch buttons 12 include a sixth button b6, a seventh button b7, an eighth button b8, a ninth button b9, and a tenth button b10.

Also, as shown in FIGS. 3 and 4, the five first physical buttons 21 include an eleventh button b11, a twelfth button b12, a thirteenth button b13, a fourteenth button b14, and a fifteenth button b15. Also, the five second physical buttons 22 include a sixteenth button b16, a seventeenth button b17, an eighteenth button b18, a nineteenth button b19, and a twentieth button b20.

As shown in FIGS. 3 and 4, arrangement of the five first touch buttons 11 corresponds to arrangement of the five first physical buttons 21. Also, arrangement of the five second touch buttons 12 corresponds to arrangement of the five second physical buttons 22.

Also, as shown in FIGS. 3 and 4, the five second touch buttons 12 are displayed adjacently to the five first touch buttons 11. Further, the five second physical buttons 22 are provided adjacently to the five first physical buttons 21. Then, a touch-button display area D1 where the five first touch buttons 11 and the five second touch buttons 12 are displayed and a physical-button placement area D2 where the five first physical buttons 21 and the five second physical buttons 22 are placed, are adjacent to each other.

The identical functions assigned to the five first touch buttons 11 are assigned to the five first physical buttons 21. Also, the identical functions assigned to the five second touch buttons 12 are assigned to the five second physical buttons 22.

More specifically, the same function is assigned to the first button b1 and the eleventh button b11. Also, the same function is assigned to the second button b2 and the twelfth button b12. Then, similarly, the same functions are assigned to the third button b3 and the thirteenth button b13, the fourth button b4 and the fourteenth button b14, the fifth button b5 and the fifteenth button b15, the sixth button b6 and the sixteenth button b16, the seventh button b7 and the seventeenth button b17, the eighth button b8 and the eighteenth button b18, the ninth button b9 and the nineteenth button b19, and the tenth button b10 and the twentieth button b20, respectively.

That is, to each of the five first physical buttons 21, the same function of one out of the five first touch buttons 11, which positionally corresponds thereto, is assigned. Also, to each of the five second physical buttons 22, the same function of one out of the five second touch buttons 12, which positionally corresponds thereto, is assigned.

Also, as shown in FIGS. 3 and 4, the first to fifth buttons b1 to b5 include first to fifth function display parts f1 to f5 (each of which is equivalent to a "function display part" according to the embodiment of the present invention), respectively. Also, the sixth to tenth buttons b6 to b10 include sixth to tenth function display parts f6 to f10, respectively.

The first to tenth function display parts f1 to f10 display functions assigned to the first to tenth buttons b1 to b10, respectively.

Also, as described above, functions of the first to tenth buttons b1 to b10 correspond to functions of the eleventh to twentieth buttons b11 to b20, respectively. This results in that the first to tenth function display parts f1 to f10 also display functions assigned to the eleventh to twentieth buttons b11 to b20, respectively.

Control Device

Figure 5:
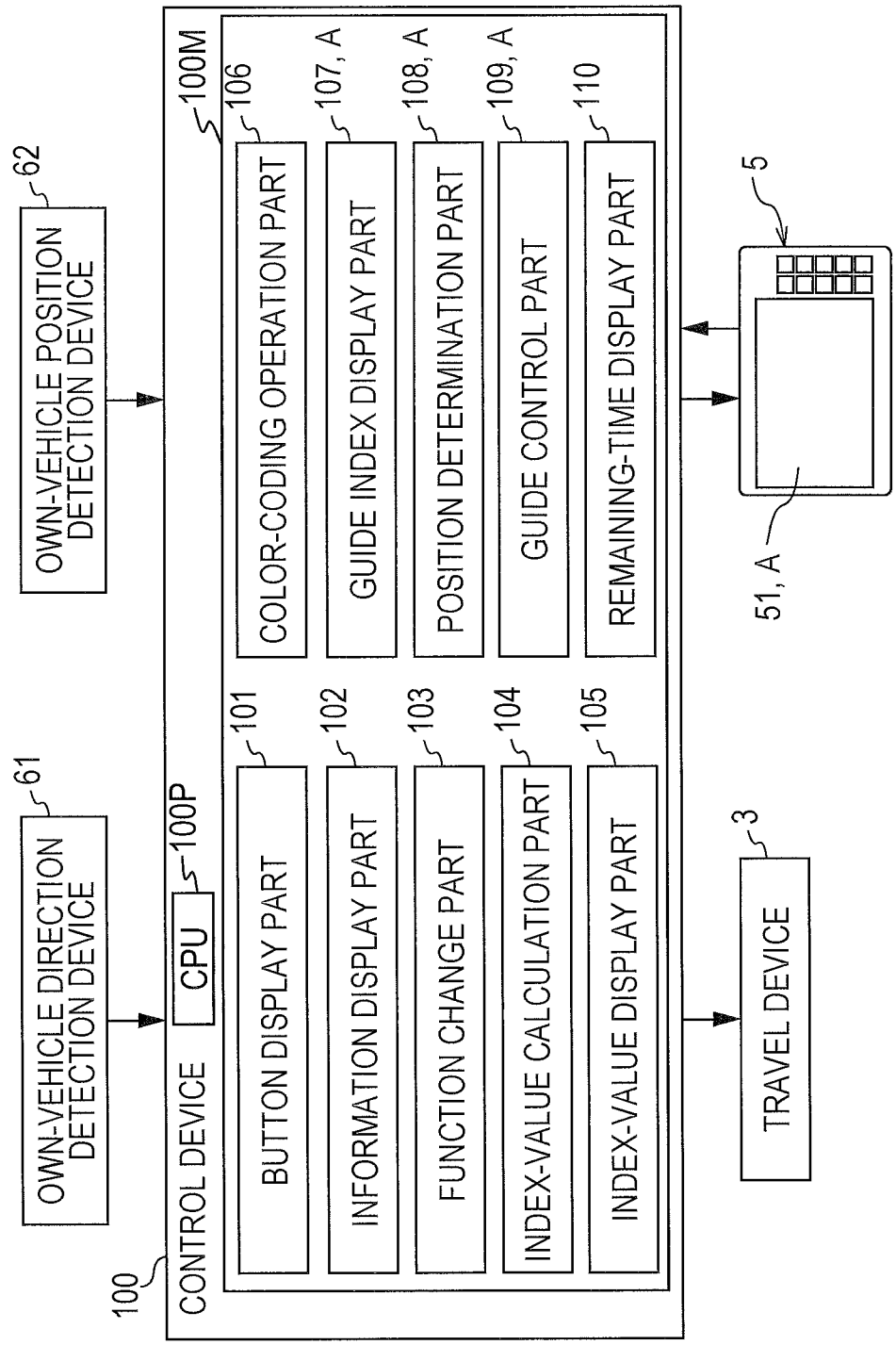
FIG. 5 is a block diagram showing a structure for control of a displaying operation of a display.

FIG. 5 shows an own-vehicle direction detection device 61, an own-vehicle position detection device 62, and a control device 100. All of the own-vehicle direction detection device 61, the own-vehicle position detection device 62, and the control device 100 are included in the tractor 1.

The own-vehicle direction detection device 61 detects a direction in which an own vehicle travels. Also, the own-vehicle position detection device 62 detects a position of an own vehicle.

As shown in FIG. 5, the control device 100 receives various signals from the own-vehicle direction detection device 61, the own-vehicle position detection device 62, and the terminal device 5. Then, the control device 100 outputs a predetermined signal to the travel device 3 and the terminal device 5, based on the received various signals.

Also, as shown in FIG. 5, the control device 100 includes a button display part 101 (which is equivalent to a "button display device" according to the embodiment of the present invention), an information display part 102 (which is equivalent to an "information display device" according to the embodiment of the present invention), a function change part 103 (which is equivalent to a "function change device" according to the embodiment of the present invention), an index-value calculation part 104, an index-value display part 105, a color-coding operation part 106, a guide index display part 107, a position determination part 108, a guide control part 109, and a remaining-time display part 110. In addition, the control device 100 includes a central processing unit (CPU) 100P (circuitry 100P) and a memory 100M. Programs of the button display part 101, the information display part 102, the function change part 103, the index-value calculation part 104, the index-value display part 105, the color-coding operation part 106, the guide index display part 107, the position determination part 108, the guide control part 109, and the remaining-time display part 110 are stored in the memory 100M and executed by the CPU 100P to perform functions of the button display part 101, the information display part 102, the function change part 103, the index-value calculation part 104, the index-value display part 105, the color-coding operation part 106, the guide index display part 107, the position determination part 108, the guide control part 109, and the remaining-time display part 110, respectively.

Also, as shown in FIGS. 3 and 5, the tractor 1 includes a travel control device A which controls travel of the tractor 1. The travel control device A includes the display 51, the guide index display part 107, the position determination part 108, and the guide control part 109.

The button display part 101 is configured to display the five first touch buttons 11 in vertical arrangement on the display 51. Also, the button display part 101 is configured to display the five second touch buttons 12 in vertical arrangement and on the right of the five first touch buttons 11 on the display 51.

The information display part 102 is configured to display work information on the display 51. For example, in FIG. 3, a position of the tractor 1 in the work field W where work travel is performed and the target travel route L in the work field W are displayed as work information on the display 51, by the information display part 102.

Below, actions of respective parts of the control device 100 will be described, following a procedure of work travel of the tractor 1, which is performed by automatic driving.

Movement to Starting Position of Work Travel

First, referring to FIGS. 6 and 7, movement of the tractor 1 to a starting position S of work travel will be described.

In conducting work in the work field W using the tractor 1, an operator activates the terminal device 5, first. Then, the operator provides inputs for various settings using the terminal device 5. At that time, the operator provides inputs for settings of a lap width of cultivation, the number of revolutions of the engine 2a, and the like, for example.

Figure 6:
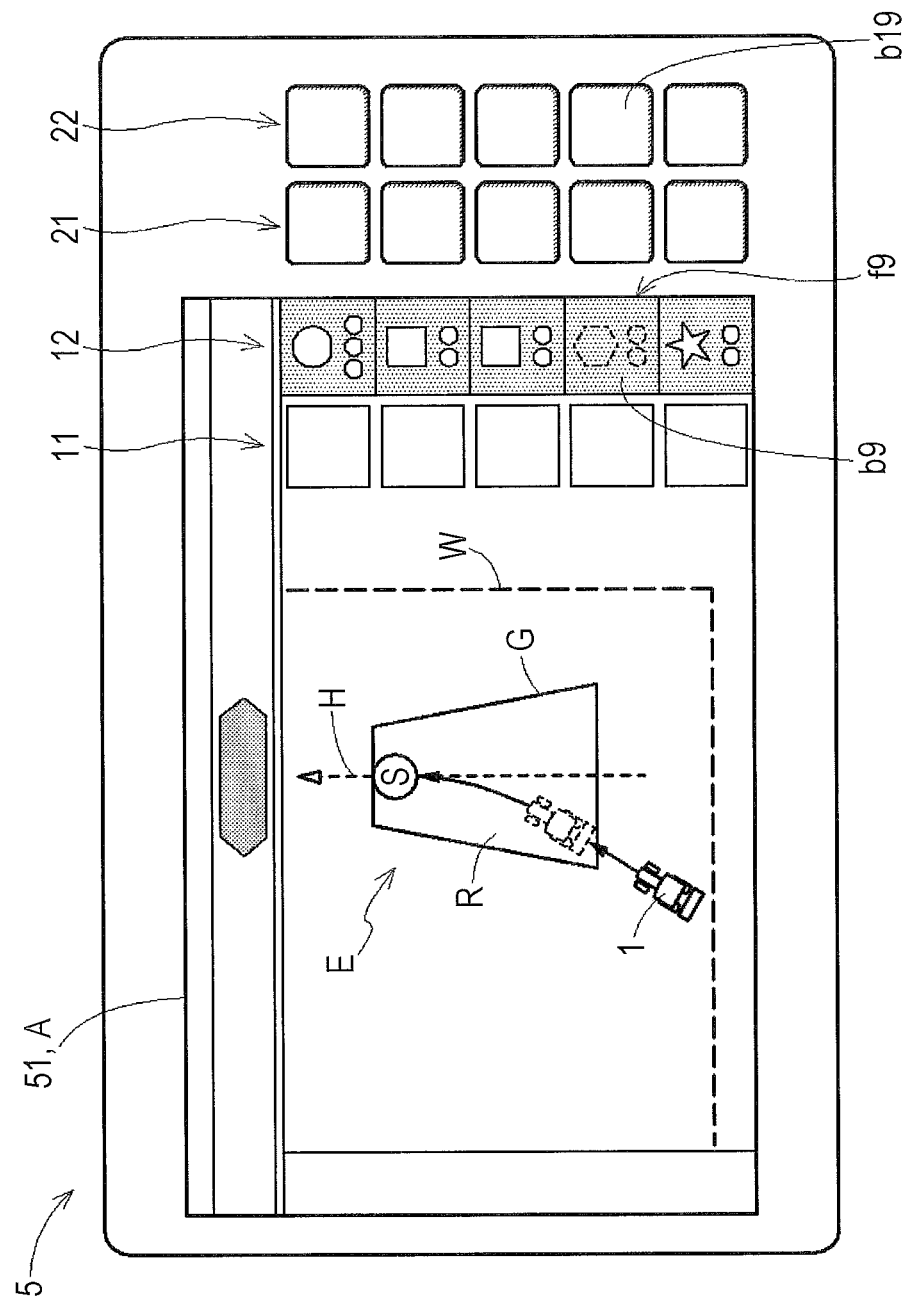
FIG. 6 is a view showing what is displayed on the display when movement to a starting position of work travel is made.

When inputting for various settings are completed, a current location of the tractor 1 and a guide index E are displayed on the display 51, as shown in FIG. 6. The guide index E is displayed on the display 51 by the guide index display part 107. Also, the guide index E corresponds to a guide start area R which is defined within the work field W.

The guide index E includes a figure G and a direction indication symbol H. The figure G represents a position and a shape of the guide start area R. Also, the direction indication symbol H represents a direction of travel of the tractor 1 at a starting time of work travel. A position of the direction indication symbol H displayed on the display 51 corresponds to a position of the guide start area R in the work field W.

As shown in FIG. 6, in the present embodiment, the guide start area R is in a trapezoidal shape. Accordingly, also the figure G displayed on the display 51 is in a trapezoidal shape. Also, in the present embodiment, the guide start area R has a shape which becomes narrower as it becomes closer to a front end in a direction of travel of the tractor 1 at a starting time of work travel.

The position determination part 108 shown in FIG. 5 is configured to determine whether or not the tractor 1 is placed within the guide start area R, based on a signal provided from the own-vehicle position detection device 62. Also, the guide control part 109 is configured to control the travel device 3 in such a manner that the tractor 1 travels to the starting position S of work travel when the position determination part 108 determines that the tractor 1 is placed within the guide start area R.

It is noted that, for determination of whether or not the tractor 1 is placed within the guide start area R, either whether a whole of the tractor 1 is placed within the guide start area R, or whether a part of the tractor 1 is placed within the guide start area R, may be determined.

Also, the guide index display part 107 shown in FIG. 5 can switch a display state of the guide index E between a first display state and a second display state. In a case where the position determination part 108 determines that the tractor 1 is not placed within the guide start area R, a display state of the guide index E becomes the first display state. On the other hand, in a case where the position determination part 108 determines that the tractor 1 is placed within the guide start area R, a display state of the guide index E becomes the second display state.

In the present embodiment, an inside of the figure G in the first display state is displayed in orange. Also, the inside of the figure G in the second display state is displayed in green. That is, a color of the guide index E in the first display state and a color of the guide index E in the second display state are different from each other.

As a result of this, an operator can grasp whether or not the tractor 1 is placed within the guide start area R.

In a case where the tractor 1 is placed in a position indicated by a solid line in FIG. 6, the position determination part 108 determines that the tractor 1 is not placed within the guide start area R. Accordingly, at that time, the guide control part 109 does not control the travel device 3. Also, at that time, the inside of the figure G is displayed in orange by the guide index display part 107.

Then, when an operator manually drives the tractor 1 and the tractor 1 reaches a position indicated by a broken line in FIG. 6, the position determination part 108 determines that the tractor 1 is placed within the guide start area R. As a result of this, the guide control part 109 starts controlling the travel device 3. Also, at that time, the guide index display part 107 changes a color of the inside of the figure G from orange to green.

It is noted that at that time, the tractor 1 may be configured to move to the position indicated by the broken line in FIG. 6 not manually, but by automatic driving.

Then, the guide control part 109 controls the travel device 3, so that the tractor 1 automatically travels from the position indicated by the broken line in FIG. 6 to the starting position S. As a result of this, movement of the tractor 1 to the starting position S is completed.

Figure 7:
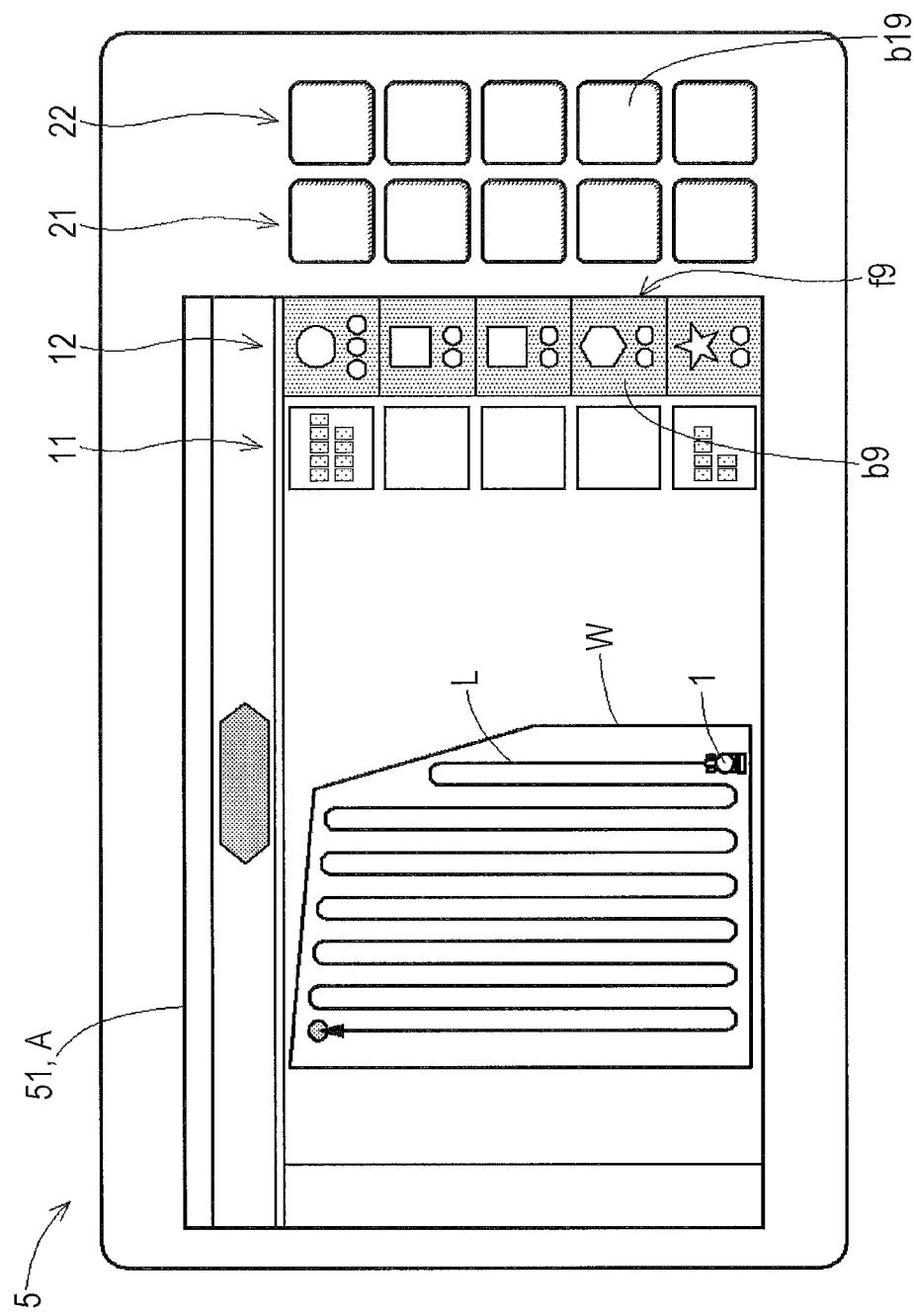
FIG. 7 is a view showing what is displayed on the display at a starting time of work travel.

When movement of the tractor 1 to the starting position S is completed, a whole of the target travel route L in the work field W is displayed on the display 51, as shown in FIG. 7. Additionally, the tractor 1 is placed in the starting position S in FIG. 7.

Also, in a state shown in FIG. 6, characters "next" are displayed faintly at the ninth function display part f9 of the ninth button b9 in the present embodiment. On the other hand, in a state shown in FIG. 7, characters "next" are displayed thickly at the ninth function display part f9 of the ninth button b9.

In a state shown in FIG. 6, both of operations of the ninth button b9 and the nineteenth button b19 are invalid. Also, in a state shown in FIG. 7, both of operations of the ninth button b9 and the nineteenth button b19 are valid.

Thus, the button display part 101 can switch a display state of the second touch button 12 between the first display state and the second display state. Then, in a case where a display state of the second touch button 12 is the first display state, both of operations of the second touch button 12 and the second physical button 22 are valid.

Also, in a case where a display state of the second touch button 12 is the second display state, both of operations of the second touch button 12 and the second physical button 22 are invalid.

More specifically, in a case where a display state of a certain second touch button 12 out of the five second touch buttons 12 is the first display state, characters or symbols are displayed thickly at the certain second touch button 12. At that time, both of operations of the certain second touch button 12 and one of the second physical buttons 22 which corresponds to the certain second touch button 12 are valid.

Also, in a case where a display state of a certain second touch button 12 out of the five second touch buttons 12 is the second display state, characters or symbols are displayed faintly at the certain second touch button 12. At that time, operations of the certain second touch button 12 and one of the second physical buttons 22 which corresponds to the certain second touch button 12 are invalid.

Function of Each Button During Work Travel

Next, referring to FIGS. 3, 4, and 8 to 10, functions of the first to twentieth buttons b1 to b20 which are fulfilled while the tractor 1 is travelling and working, will be described.

After movement of the tractor 1 to the starting position S is completed, upon an operator's press of a driving start button (not shown) included in the tractor 1, work travel by automatic driving is started. FIGS. 3, 4, and 8 to 10 show the terminal device 5 during work travel of the tractor 1.

Figure 8:
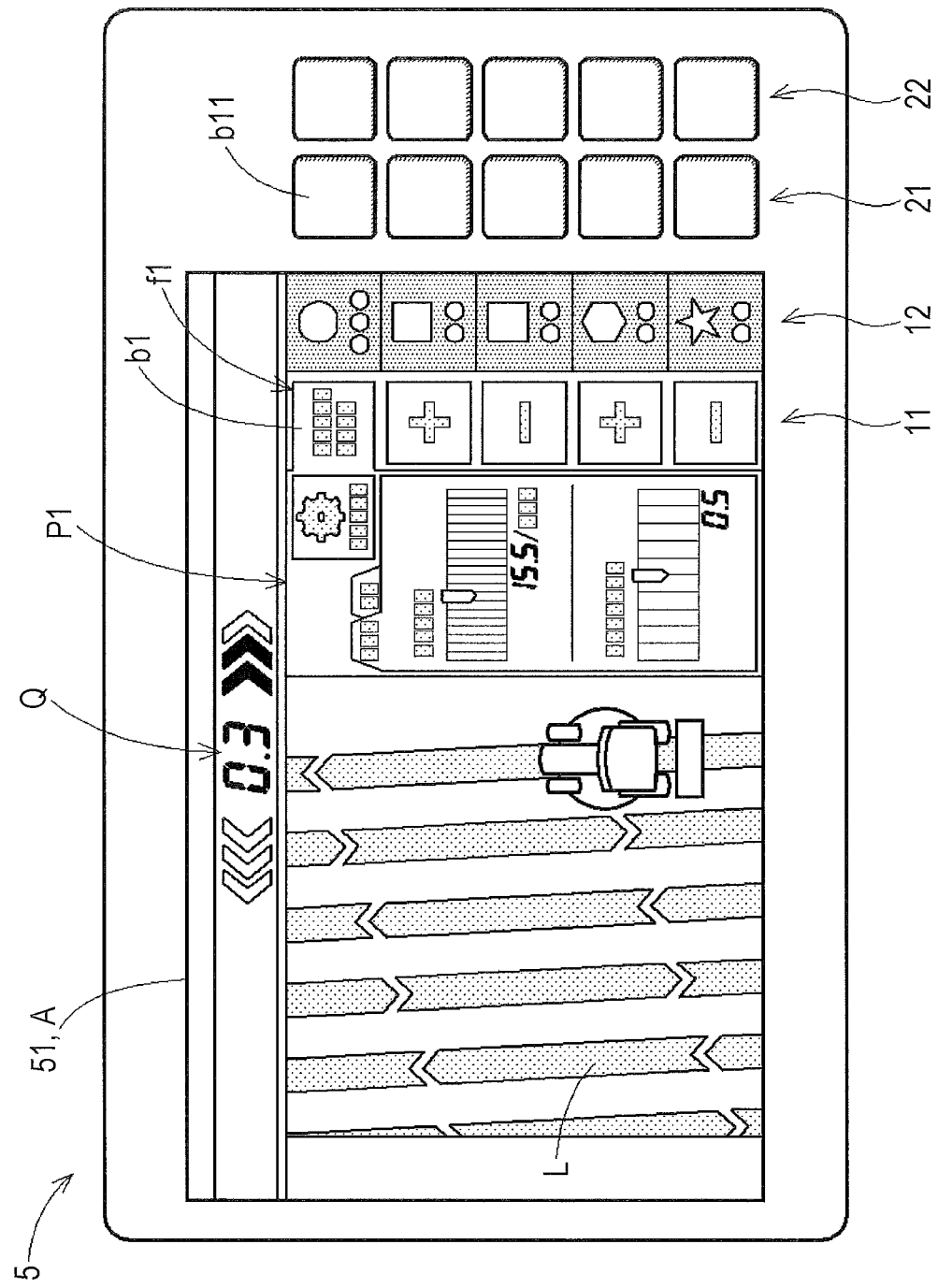
FIG. 8 is a view showing what is displayed on the display during work travel.

While the tractor 1 is travelling and working, characters "change of setting" are displayed at the first function display part f1 of the first button b1 in the present embodiment, though FIGS. 3, 4, and 8 provide schematic illustration. In a state shown in FIG. 3, when an operator operates the first button b1 or the eleventh button b11, a setting change window P1 is displayed as shown in FIG. 8.

In the setting change window P1, a current vehicle speed of the tractor 1 and a depth of plowing are displayed. Additionally, each of the vehicle speed and the depth of plowing is one kind of the above-described work information.

Also, while the tractor 1 is traveling and working, characters "display of state" are displayed at the second function display part f2 of the second button b2 in the present embodiment, though FIGS. 3 and 4 provide schematic illustration. Also, characters "recording of work" are displayed at the third function display part f3 of the third button b3. Also, characters "display of track" are displayed at the fourth function display part f4 of the fourth button b4. Also, characters "erasing of track" are displayed at the fifth function display part f5 of the fifth button f5.

When the setting change window P1 is displayed, what is displayed at the second function display part f2 of the second button b2 shown in FIGS. 3 and 4 is changed from characters "display of state" to a symbol "+" as shown in FIG. 8. Also, at the same time, what is displayed at the third function display part f3 is changed from "recording of work" to "−", what is displayed at the fourth function display part f4 is changed from "display of track" to "+", and what is displayed at the fifth function display part f5 is changed from "erasing of track" to "−".

Also, at that time, respective functions assigned to the five first touch buttons 11 and the five first physical buttons 21 are changed.

As shown in FIG. 3, when the setting change window P is not displayed, a function of the first button b1 and the eleventh button b11 is to open the setting change window P1. Also, a function of the second button b2 and the twelfth button b12 is to display a state of a vehicle, such as an oil temperature of the transmission 6. Also, a function of the third button b3 and the thirteenth button b13 is to open a work situation window P2 shown in FIG. 9. Also, a function of the fourth button b4 and the fourteenth button b14 is to display a travel track of the tractor 1. Also, a function of the fifth button b5 and the fifteenth button b15 is to erase a recorded travel track of the tractor 1.

On the other hand, as shown in FIG. 8, when the setting change window P1 is displayed, a function of the first button b1 and the eleventh button b11 is to close the setting change window P1. Also, a function of the second button b2 and the twelfth button b12 is to increase a set vehicle speed of the tractor 1. Also, a function of the third button b3 and the thirteenth button b13 is to reduce a set vehicle speed of the tractor 1. Also, a function of the fourth button b4 and the fourteenth button b14 is to increase a depth of plowing of the tractor 1. Also, a function of the fifth button b5 and the fifteenth button b15 is to reduce a depth of plowing of the tractor 1.

That is, when the setting change window P1 is displayed, functions assigned to the five first touch buttons 11 and the five first physical buttons 21 are changed, respectively. Then, such a change in function is carried out by the function change part 103 in accordance with work information displayed on the display 51.

Thus, the function change part 103 is configured to change respective functions assigned to the five first touch buttons 11 and the five first physical buttons 21 in accordance with work information displayed on the display 51.

Also, while the tractor 1 is travelling and working, characters "current location" are displayed at the sixth function display part f6 of the sixth button b6 out of the five second touch buttons 12 in the present embodiment, though FIGS. 3 and 4 provide schematic illustration. Also, characters "enlargement" are displayed at the seventh function display part f7 of the seventh button b7. Also, characters "reduction" are displayed at the eighth function display part f8 of the eighth button b8. Also, characters "next" are displayed at the ninth function display part f9 of the ninth button b9. Also, characters "return" are displayed at the tenth function display part f10 of the tenth button b10.

Then, as shown in FIG. 8, even when the setting change window P1 is displayed, what is displayed at the sixth function display part f6, the seventh function display part f7, the eighth function display part f8, the ninth function display part f9, and the tenth function display part f10 of the five second touch buttons 12 is not changed.

Also, respective functions assigned to the five second touch buttons 12 and the five second physical buttons 22 are unchanged irrespective of whether or not the setting change window P1 is displayed.

More specifically, as shown in FIGS. 3, 4, and 8, in both of a case where the setting change window P1 is displayed and a case where the setting change window P1 is not displayed, a function of the sixth button b6 and the sixteenth button b16 is to display a current location of the tractor 1 in the work field W. Also, a function of the seventh button b7 and the seventeenth button b17 is to enlarge map display of the work field W on the display 51. Also, a function of the eighth button b8 and the eighteenth button b18 is to reduce map display of the work field W on the display 51. Also, a function of the ninth button b9 and the nineteenth button b19 is to allow message display, display for various settings, or the like on the display 51 to proceed to a next screen. Also, a function of the tenth button b10 and the twentieth button b20 is to return to a preceding screen.

Thus, respective functions assigned to the five second touch buttons 12 and the five second physical button 22 are unchanged irrespective of work information displayed on the display 51.

Figure 9:
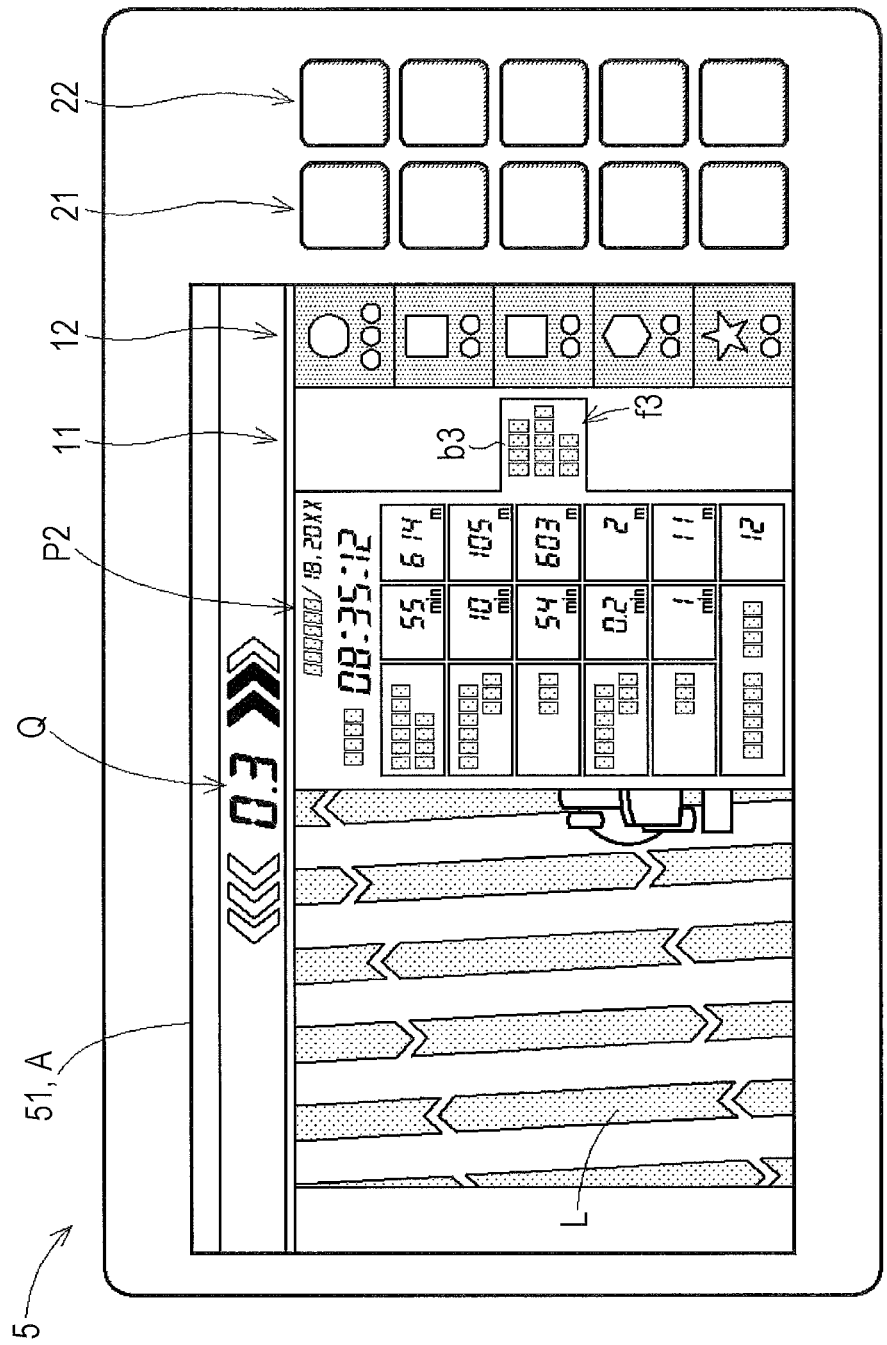
FIG. 9 is a view showing what is displayed on the display during work travel.

Also, in FIG. 8, all of the first touch buttons 11 are displayed on the display 51. On the other hand, as shown in FIG. 9, when the work situation window P2 is displayed, the first button b1, the second button b2, the fourth button b4, and the fifth button b5 out of the five first touch buttons 11 are not displayed on the display 51.

Then, in a state shown in FIG. 8, all of operations of the five first touch buttons 11 are valid. On the other hand, in a state shown in FIG. 9, all of operations of the first button b1, the second button b2, the fourth button b4, and the fifth button b5 out of the five first touch buttons 11 are invalid. Also, in a state shown in FIG. 9, all of operations of the eleventh button b11, the twelfth button b12, the fourteenth button b14, and the fifteenth button b15 are invalid.

Thus, the button display part 101 can switch a display state of the first touch button 11 between the first display state and the second display state. Then, in a case where a display state of the first touch button 11 is the first display state, both of operations of the first touch button 11 and the first physical button 21 are valid.

Also, in a case where a display state of the first touch button 11 is the second display state, both of operations of the first touch button 11 and the first physical button 21 are invalid.

More specifically, in a case where a display state of a certain first touch button 11 out of the five first touch buttons 11 is the first display state, the certain first touch button 11 is displayed on the display 51. At that time, both operations of the certain first touch button 11 and one of the first physical buttons 21 which corresponds to the certain first touch button 11 are valid.

Also, in a case where a display state of a certain first touch button 11 out of the five first touch buttons 11 is the second display state, the certain first touch button 11 is not displayed on the display 51. At that time, both of operations of the certain first touch button 11 and one of the first physical buttons 21 which corresponds to the certain first touch button 11 are invalid.

Display of Index Value During Work Travel

As shown in FIG. 3 and FIGS. 8 to 10, an index-value display area Q is located in an upper portion of the display 51. In the index-value display area Q, an index value which indicates a degree of deviation of an actual travel track from the target travel route L.

In the present embodiment, the foregoing index value is a directional deviation which is a deviation of travel direction of an own vehicle from a direction of the target travel route L. It is noted that the index value is not limited to a directional deviation, and may be a positional deviation of an own vehicle from the target travel route L.

In the present embodiment, a directional deviation serving as an index value is calculated by the index-value calculation part 104 based on a signal provided from the own-vehicle direction detection device 61. Then, the calculated directional deviation is displayed in the index-value display area Q by the index-value display part 105. It is noted that what is displayed in the index-value display area Q by the index-value display part 105 is not limited to a number. The index-value display part 105 can display also an indicator or the like which indicates a direction of deviation or an amount of directional deviation, in the index-value display area Q.

Also, the index-value display part 105 is configured to display a directional deviation in any color of green, yellow, and red on the display 51, depending on an amount of a directional deviation. More specifically, a color of a directional deviation which is displayed is green when a directional deviation is relatively small, is yellow when a directional deviation is moderate, and is red when a directional deviation is relatively large.

Figure 10:
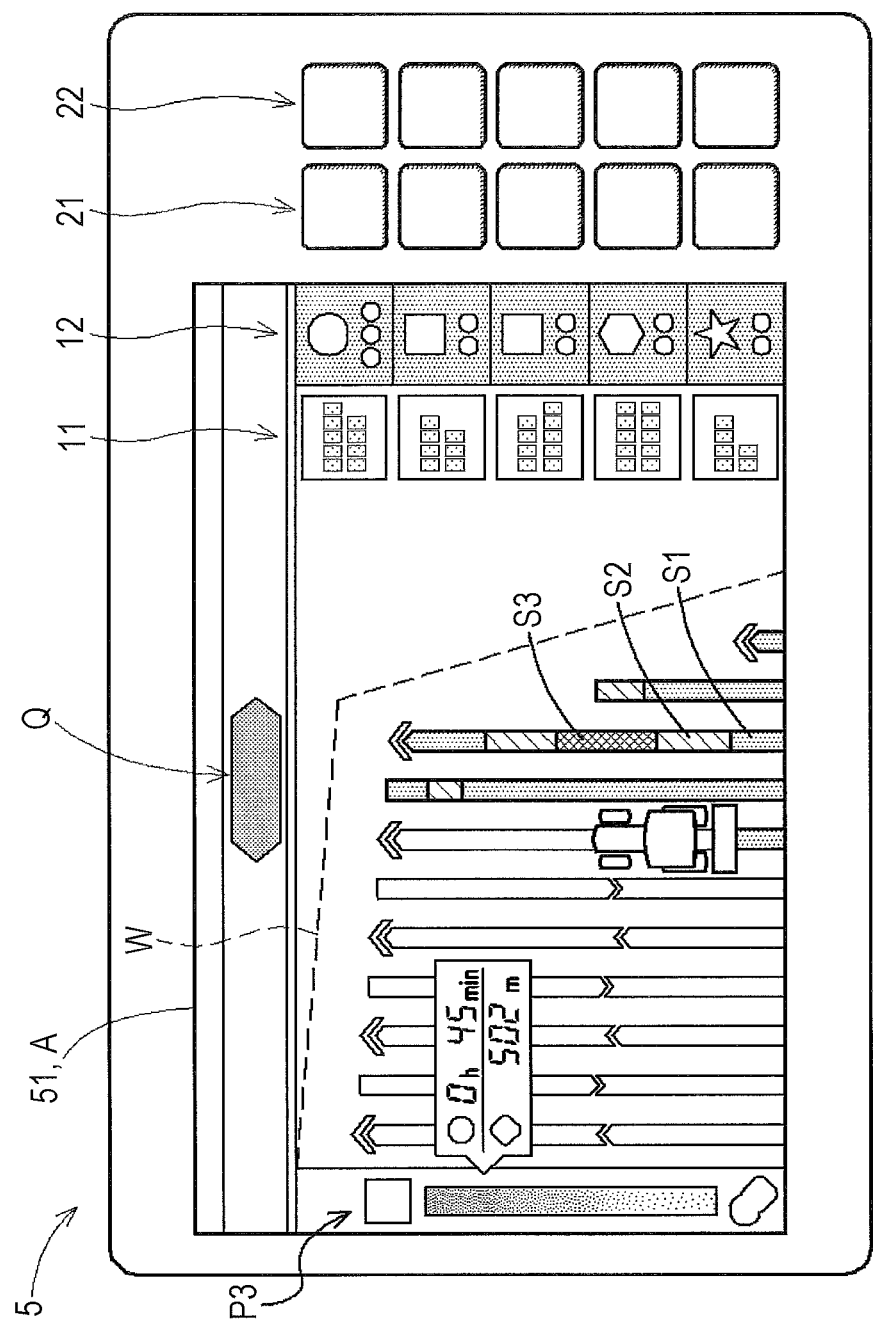
FIG. 10 is a view showing what is displayed on the display during work travel.

As shown in FIGS. 3 and 10, in a case where a directional deviation is relatively small, no number is displayed in the index-value display area Q. At that time, a green indicator in a shape of a hexagon which is horizontally lengthened is displayed in the index-value display area Q by the index-value display part 105. This indicator informs an operator that a current directional deviation is relatively small. That is, the indicator serves to display a directional deviation.

Also, as shown in FIGS. 8 and 9, in a case where a directional deviation is moderate or relatively large, a number indicating a directional deviation is displayed in the index-value display area Q by the index-value display part 105. Also, at that time, an indicator indicating a direction and an amount of deviation is displayed in a position adjacent to the number indicating a directional deviation by the index-value display part 105. In an example shown in FIGS. 8 and 9, the indicator indicates that a travel direction of an own vehicle deviates rightward from a direction of the target travel route L.

Then, such a number and indicator as described above are displayed in yellow when a directional deviation is moderate, and are displayed in red when a directional deviation is relatively large.

The color-coding operation part 106 shown in FIG. 5 is configured to color-code a portion which the tractor 1 has traveled in the target travel route L displayed on the display 51, with the use of colors of green, yellow, and red, as shown in FIG. 10.

More specifically, the color-coding operation part 106 color-codes in green, a section where a directional deviation is displayed in green, color-codes in yellow, a section where a directional deviation is displayed in yellow, and color-codes in red, a section where a directional deviation is displayed in red, in the index-value display area Q.

In the present embodiment, assume that a directional deviation is displayed in green in the index-value display area Q when the tractor 1 travels a first section s1 shown in FIG. 10. Also, assume that a directional deviation is displayed in yellow in the index-value display area Q when the tractor 1 travels a second section s2 shown in FIG. 10. Also, assume that a directional deviation is displayed in red in the index-value display area Q when the tractor 1 travels a third section s3 shown in FIG. 10.

In this case, as shown in FIG. 10, the first section s1 in the target travel route L displayed on the display 51 is color-coded in green. Also, the second section s2 is color-coded in yellow. Also, the third section s3 is color-coded in red.

Thus, the color-coding operation part 106 is configured to color-code a portion where travel is finished in the target travel route L displayed on the display 51, in accordance with an index value.

As shown in FIG. 10, the display 51 can display a remaining-time display window P3. In the remaining-time display window P3, an estimated value of remaining time before the tractor 1 finishes travelling a whole of the target travel route L is displayed.

The estimated value of remaining time is displayed on the display 51 by the remaining-time display part 110 shown in FIG. 5.

According to the above-described configuration, the tractor 1 includes not only the first touch buttons 11 displayed on the display 51, but also the first physical buttons 21. Then, the identical functions assigned to the first touch buttons 11 are assigned to the first physical buttons 21.

Accordingly, with the above-described configuration, an operator can provide a correct operation input while checking a position of the first physical button 21 by a touch with his fingers even during work travel, by operating the first physical button 21 in place of the first touch button 11. Then, this allows the identical function assigned to the first touch button 11 to be fulfilled.

Also, with the above-described configuration, functions assigned to the first touch buttons 11 and the first physical buttons 21 are changed in accordance with work information displayed on the display 51. Then, functions assigned to the first touch buttons 11 and the first physical buttons 21 are displayed at the first to fifth function display parts f1 to f5 included in the first touch buttons 11.

Accordingly, with the above-described configuration, it is possible to assign various functions to one first physical buttons 21 depending on respective situations. Further, even if functions assigned to the first physical buttons 21 are changed, an operator can confirm what functions are currently assigned to the first physical buttons 21 by seeing the first to fifth function display parts f1 to f5 included in the first touch buttons 11.

Figure 11:
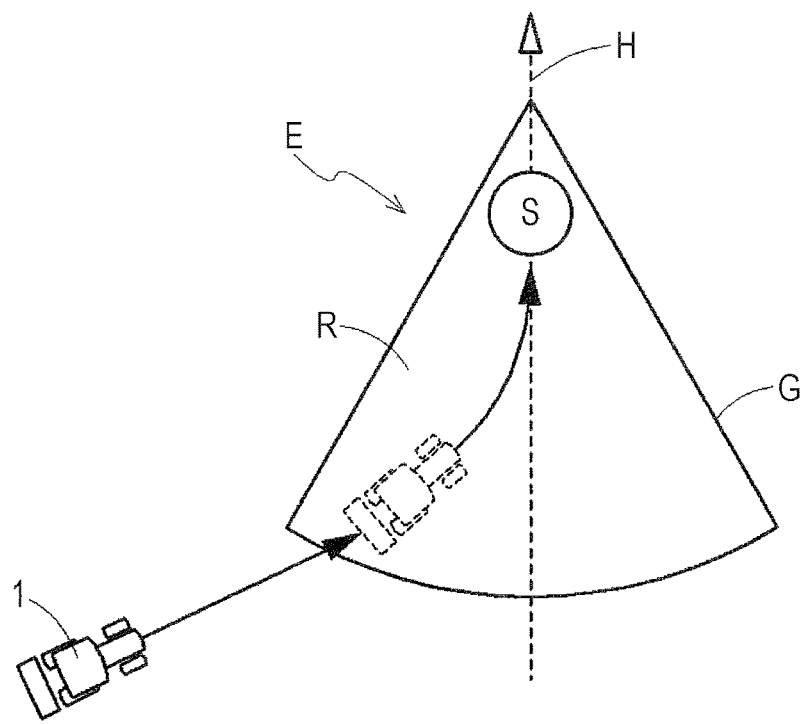
FIG. 11 is a view showing a guide start area in the other embodiment.
Figure 12:
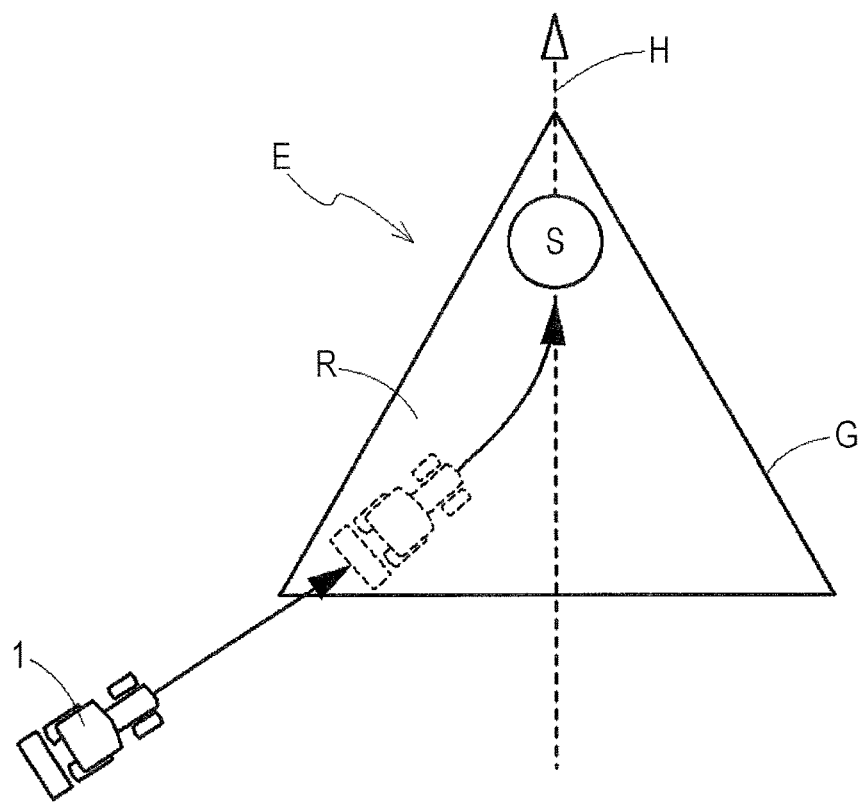
FIG. 12 is a view showing a guide start area in the other embodiment.
Figure 13:
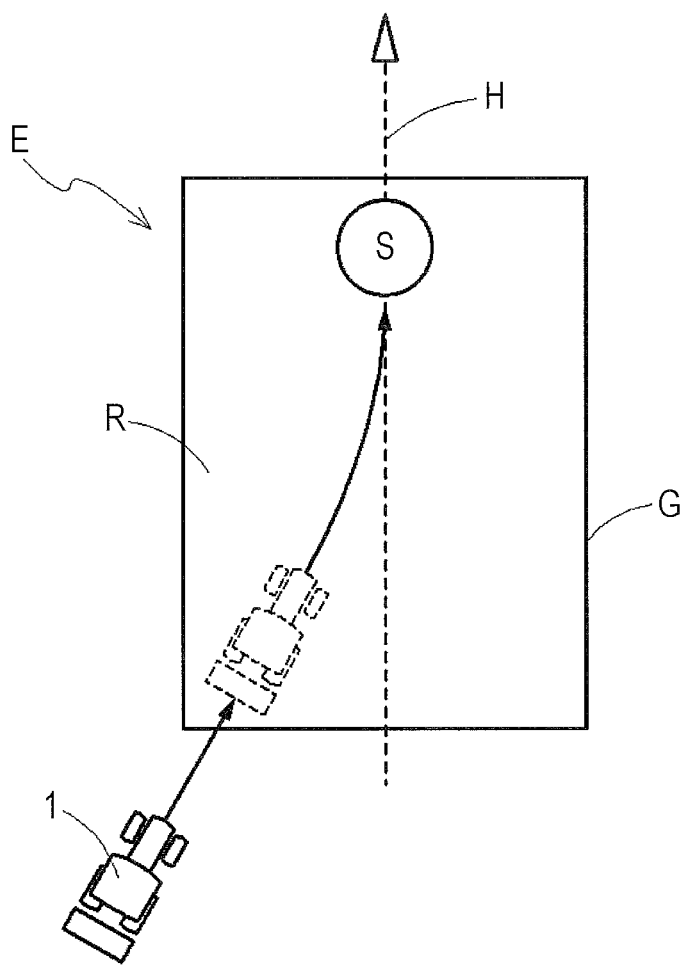
FIG. 13 is a view showing a guide start area in the other embodiment.

Other Embodiments (1) In the above-described embodiment, the guide start area R is in a trapezoidal shape as shown in FIG. 6. For this reason, also the figure G displayed on the display 51 is in a trapezoidal shape. However, in place of this configuration, there may be provided a configuration in which the guide start area R is in a shape of sector and also the figure G displayed on the display 51 is in a shape of sector as shown in FIG. 11. Also, there may be provided a configuration in which the guide start area R is a triangular shape and also the figure G displayed on the display 51 is in a triangular shape, as shown in FIG. 12. Also, there may be provided a configuration in which the guide start area R is a rectangular shape and also the figure G displayed on the display 51 is in a rectangular shape, as shown in FIG. 13.

(2) In the above-described embodiment, the first touch buttons 11, the second touch buttons 12, the first physical buttons 21, and the second physical buttons 22 each include five buttons which are in vertical arrangement. However, in place of this configuration, there may be provided a configuration in which a plurality of the first touch buttons 11, a plurality of the second touch buttons 12, a plurality of the first physical buttons, 21, and a plurality of the second physical buttons are each provided in horizontal arrangement. Also, the number of first touch buttons 11, the second touch buttons 12, the first physical buttons 21, or the second physical buttons 22 may be six or more, and may be four or less. Also, the first touch buttons 11, the second touch buttons 12, the first physical buttons 21, and the second physical buttons 22 may each include one button.

(3) The second touch buttons 12 may be omitted.

(4) The second physical buttons 22 may be omitted.

(5) There may be provided a configuration in which in a case where a display state of a certain second touch button 12 out of the plurality of second touch buttons 12 is the first display state, the certain second touch button 12 is displayed on the display 51, and in a case where the display state is the second display state, the certain second touch button 12 is not displayed on the display 51.

(6) There may be provided a configuration in which in a case where a display state of a certain first touch button 11 out of the plurality of first touch buttons 11 is the first display state, characters or symbols are displayed thickly at the certain first touch button 11, and in a case where the display state is the second display state, characters or symbols are displayed faintly at the certain first touch button 11.

(7) There may be provided a configuration in which each of display states of the plurality of first touch buttons 11 cannot be switched between the first display state and the second display state.

(8) There may be provided a configuration in which each of display states of the plurality of second touch buttons 12 cannot be switched between the first display state and the second display state.

(9) The plurality of first touch buttons 11 and the plurality of second touch buttons 12 are not necessarily required to be adjacent to each other. For example, there may be provided a configuration in which the plurality of first touch buttons 11 are placed in a left end portion of the display 51 and the plurality of the second touch buttons 12 are placed in a right end portion of the display 51.

(10) The touch-button display area D1 and the physical-button placement area D2 are not necessarily required to be adjacent to each other. For example, there may be provided a configuration in which the touch-button display area D1 is placed in a left end portion of the display 51 and the physical-button placement area D2 is placed in a position on the right of the display 51.

(11) The travel device 3 may be of either a crawler type or a semi-crawler type.

(12) A color of an inside of the figure G in a case where a display state of the guide index E is the first display state may be displayed in other colors than orange.

(13) A color of an inside of the figure G in a case where a display state of the guide index E is the second display state may be displayed in other colors than green.

(14) A color of the guide index E in the first display state and a color of the guide index E in the second display state may be identical to each other. In such a case, there may be provided a configuration in which the guide index E in the first display state is displayed in a blinking state, and the guide index E in the second display state is displayed in a simply-lighted-up state, for example.

(15) There may be provided a configuration in which a display state of the guide index E cannot be switched between the first display state and the second display state.

(16) The guide index E may include only the direction indication symbol H out of the figure G and the direction indication symbol H. In other words, there may be provided a configuration in which only the direction indication symbol H is displayed on the display 51 and the figure G is not displayed.

(17) The guide index E may include only the figure G out of the figure G and the direction indication symbol H. In other words, there may be provided a configuration in which only the figure G is displayed on the display 51 and the direction indication symbol H is not displayed.

(18) The own-vehicle direction detection device 61 may be omitted.

(19) The own-vehicle position detection device 62 may be omitted.

(20) There may be provided a configuration in which no index value is displayed on the display 51.

(21) A color of an index value displayed on the display 51 may be consistently unchanged irrespective of a magnitude of an index value.

(22) The color-coding operation part 106 may be configured so as to color-code the target travel route L independently of a color of an index value displayed on the display 51.

(23) A color of an index value displayed on the display 51 may be any of the other colors than green, yellow, and red.

(24) Color-coding performed by the color-coding operation part 106 is not limited to a color-coding pattern in the above-described embodiment. For example, there may be provided a configuration in which the target travel route L is color-coded in other combinations of colors than a combination of green, yellow, and red. Also, there may be provided a configuration in which the target travel route L is color-coded in two colors, or a configuration in which the target travel route L is color-coded in four or more colors.

(25) The remaining-time display part 110 may be omitted.

(26) The tractor 1 may be configured such that work travel by automatic driving cannot be performed and only manual work travel can be performed.

INDUSTRIAL APPLICABILITY

The embodiment of the present invention is applicable to a head-feeding combine-harvester, a normal-type combine-harvester, a corn harvester, a rice transplanting machine, and the like, in addition to a tractor.

According to an embodiment of the present invention, a work vehicle includes: a touch-panel display; a button display device which displays a first touch button on the display; an information display device which displays work information which is information about work, on the display; and a first physical button provided outside the display to which a function which is the same as a function assigned to the first touch button is assigned, in which the first touch button includes a function display part which displays a function assigned to the first touch button and the first physical button, and a function change device which changes a function assigned to the first touch button and the first physical button in accordance with the work information displayed on the display is further included.

According to the embodiment of the present invention, the work vehicle includes not only the first touch button displayed on the display, but also the first physical button. Then, an identical function as assigned to the first touch button and the first physical button.

Therefore, according to the embodiment of the present invention, an operator can provide a correct operation input while checking a position of the first physical button by a touch with his fingers even during work travel, by operating the first physical button in place of the first touch button. Then, this allows the identical function assigned to the first touch button to be fulfilled.

Also, according to the embodiment of the present invention, a function assigned to the first touch button and the first physical button is changed in accordance with work information displayed on the display. Then, a function assigned to the first touch button and the first physical button is displayed at the function display part included in the first touch button.

Therefore, according to the embodiment of the present invention, it is possible to assign various functions to one first physical button, depending on respective situations. Further, even if a function assigned to the first physical button is changed, an operator can confirm what function is currently assigned to the first physical button by seeing the function display part included in the first touch button.

Further, it is preferable in the embodiment of the present invention that the button display device is capable of switching a display state of the first touch button between a first display state and a second display state, both of operations of the first touch button and the first physical button are valid when a display state of the first touch button is the first display state, and both of operations of the first touch button and the first physical button are invalid when a display state of the first touch button is the second display state.

With the above-described configuration, a work vehicle which can make the first touch button and the first physical button valid or invalid depending on each situation, can be implemented. Further, with the above-described configuration, it is possible to inform an operator that the first touch button and the first physical button are valid or invalid, through a display state of the first touch button.

Further, it is preferable in the embodiment of the present invention that the first touch button is not displayed on the display when a display state of the first touch button is the second display state.

With the above-described configuration, in a case where the first touch button and the first physical button are invalid, the first touch button is not displayed on the display. This easily allows an operator to intuitively understand that the first touch button and the first physical button are invalid.

Further, with the above-described configuration, when the first touch button and the first physical button are invalid, an area where the first touch button has been displayed on the display can be utilized as a display area for work information. Accordingly, when the first touch button and the first physical button are invalid, a display area for work information on the display can be increased.

Further, it is preferable in the embodiment of the present invention that the button display device is configured to display a plurality of the first touch buttons in vertical arrangement on the display, a plurality of the first physical buttons are provided in vertical arrangement, arrangement of the plurality of the first touch buttons corresponds to arrangement of the plurality of the first physical buttons, different functions are assigned to the plurality of the first touch buttons, respectively, and functions are assigned to the plurality of the first physical buttons, the functions being the same as functions assigned to the plurality of the first touch buttons that are positioned corresponding to the plurality of the first physical buttons, respectively.

With the above-described configuration, it is easy for an operator to intuitively grasp to which functions of the plurality of the first touch buttons, the plurality of the first physical buttons correspond, respectively.

Further, it is preferable in the embodiment of the present invention that the button display device is configured to display a plurality of second touch buttons in vertical arrangement adjacently to the plurality of the first touch buttons, on the display, a plurality of second physical buttons are provided in vertical arrangement adjacently to the plurality of the first physical buttons, arrangement of the plurality of the second touch buttons corresponds to arrangement of the plurality of the second physical buttons, different functions are assigned to the plurality of the second touch buttons, respectively, functions are assigned to the plurality of the second physical buttons, the functions being the same as functions assigned to the plurality of the second touch buttons that are positioned corresponding to the plurality of the first physical buttons, respectively, and the functions assigned to the second touch buttons and the second physical buttons are unchanged irrespective of the work information displayed on the display.

With the above-described configuration, it is easy for an operator to intuitively grasp to which functions of the plurality of the second touch buttons, the plurality of the second physical buttons correspond, respectively.

Further, with the above-described configuration, by assigning a function which is always required irrespective of a work situation, such as a function of returning to a preceding screen, for example, to any of the second touch buttons and any of the second physical buttons, it is possible to allow an operator to easily remember positions of the second touch button and the second physical button to which the foregoing function is assigned, so that operability is improved.

Further, it is preferable in the embodiment of the present invention that the button display device is capable of switching each of display states of the second touch buttons between a first display state and a second display state, both of operations of each of the second touch buttons and each of the second physical buttons are valid when a display state of each of the second touch buttons is the first display state, and both of operations of each of the second touch buttons and each of the second physical buttons are invalid when a display state of each of the second touch buttons is the second display state.

With the above-described configuration, a work vehicle which can make the second touch buttons and the second physical buttons valid or invalid depending on each situation, can be implemented. Further, with the above-described configuration, it is possible to inform an operator that the second touch buttons and the second physical buttons are valid or invalid through each of display states of the second touch buttons.

Further, it is preferable in the embodiment of the present invention that a touch-button display area where the plurality of the first touch buttons and the plurality of the second touch buttons are displayed and a physical-button placement area where the plurality of the first physical buttons and the plurality of the second physical buttons are placed are adjacent to each other.

With the above-described configuration, the plurality of the first physical buttons and the plurality of the second physical buttons, as well as the plurality of the first touch buttons and the plurality of the second touch buttons, can simultaneously come within sight of an operator easily. Accordingly, an operator can easily grasp correspondences between respective functions of the plurality of the first physical buttons and the plurality of the second physical buttons, and respective functions of the plurality of the first touch buttons and the plurality of the second touch buttons.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
   a touch-panel display to display at least one first touch button, at least one first function displayed in the at least one first touch button to which the at least one first function is assigned, and work information including a state of work which the work vehicle performs;
   at least one first physical button which is provided outside the touch-panel display and to which the at least one first function is assigned; and
   circuitry configured to change the at least one first function assigned to the at least one first touch button and the at least one first physical button in accordance with the work information,
   wherein a first identical first function of the at least one first function is assigned to both a first touch button of the at least one first touch button and a first physical button of the at least one first physical button that is positionally aligned with the first touch button,
   wherein, when the circuitry changes the at least one first function assigned to the first touch button and the first physical button, a second identical first function of the at least one first function is assigned to both the first touch button and the first physical button that is positionally aligned with the first touch button,
   wherein the at least one first touch button includes a plurality of first touch buttons arranged in a first line, the plurality of first touch buttons including the first touch button and a second touch button,
   wherein the at least one first physical button includes a plurality of first physical buttons arranged in a second line parallel to the first line, the plurality of second physical buttons including the first physical button and a second physical button,
   wherein the first touch button is aligned with the first physical button in a direction perpendicular the first line, wherein the second touch button is aligned with the second physical button in the direction perpendicular the first line,
wherein a third identical first function of the at least one first function is assigned to both the second touch button and the second physical button, and
wherein, when the circuitry changes the at least one first function assigned to the second touch button and the second physical button, a fourth identical first function of the at least one first function is assigned to both the second touch button and the second physical button.

2. The work vehicle according to claim 1,
wherein the circuitry is configured to switch a display state of the plurality of first touch buttons between a first display state and a second display state,
wherein the circuitry is configured to enable operations of both the plurality of first touch buttons and the plurality of first physical buttons when the display state of the plurality of first touch buttons is switched to the first display state, and
wherein the circuitry is configured to disable operations of both the plurality of first touch buttons and the plurality of first physical buttons when the display state of the plurality of first touch buttons is switched to the second display state.

3. The work vehicle according to claim 2, wherein the plurality of first touch buttons is not displayed on the touch-panel display when the display state of the plurality of first touch buttons is switched to the second display state.

4. The work vehicle according to claim 1,
wherein the at least one first function includes a plurality of first functions which are different from each other, and
wherein each of the plurality of first touch buttons corresponding to each of the plurality of first physical buttons in a sequential order, each of the plurality of first functions being assigned to a touch button of the plurality of first touch buttons and a physical button of the plurality of first physical buttons, the touch button corresponding to the physical button.

5. The work vehicle according to claim 1, further comprising:
a plurality of second physical buttons provided adjacently to the plurality of first physical buttons outside the touch-panel display,
wherein the touch-panel display is to display a plurality of second touch buttons which are provided adjacently to the plurality of first touch buttons, a plurality of second functions being assigned to the plurality of second physical buttons and the plurality of second touch buttons corresponding to the plurality of second physical buttons, and
wherein the plurality of second functions are unchanged regardless of the work information displayed on the touch-panel display.

6. The work vehicle according to claim 4, further comprising:
a plurality of second physical buttons arranged in a third line substantially parallel to and adjacent to the second line,
wherein the touch-panel display is to display a plurality of second touch buttons arranged in a fourth line which is substantially parallel to and adjacent to the first line, each of the plurality of second touch buttons corresponding to each of the plurality of second physical buttons in a sequential order,
wherein a plurality of second functions, which are different from each other, are assigned to the plurality of second touch buttons and the plurality of second physical buttons such that each of the plurality of second functions is assigned to a touch button of the plurality of second touch buttons and a physical button of the plurality of second physical buttons, the touch button corresponding to the physical button being arranged in the side direction, and
wherein the plurality of second functions are unchanged regardless of the work information displayed on the touch-panel display.

7. The work vehicle according to claim 5,
wherein the circuitry is configured to switch a display state of the plurality of second touch buttons between a first display state and a second display state,
wherein the circuitry is configured to enable operations of both the plurality of second touch buttons and the plurality of second physical buttons when the display state of the plurality of second touch buttons is switched to the first display state, and
wherein the circuitry is configured to disable operations of both the plurality of second touch buttons and the plurality of second physical buttons when the display state of the plurality of second touch buttons is switched to the second display state.

8. The work vehicle according to claim 6,
wherein the circuitry is configured to switch each of display states of the plurality of second touch buttons between a first display state and a second display state,
wherein the circuitry is configured to enable operations of both each of the plurality of second touch buttons and each of the plurality of second physical buttons when the display state of each of the plurality of second touch buttons is switched to the first display state, and
when the circuitry is configured to disable operations of both each of the plurality of second touch buttons and each of the plurality of second physical buttons when the display state of each of the plurality of second touch buttons is switched to the second display state.

9. The work vehicle according to claim 5, wherein a touch-button display area where the plurality of first touch buttons and the plurality of second touch buttons are displayed is adjacent to a physical-button placement area where the plurality of first physical buttons and the plurality of second physical buttons are provided.

10. The work vehicle according to claim 6, wherein a touch-button display area where the plurality of first touch buttons and the plurality of second touch buttons are displayed is adjacent to a physical-button placement area where the plurality of first physical buttons and the plurality of second physical buttons are provided.

11. A display control method for a work vehicle, comprising:
displaying at least one first touch button, at least one first function, and work information on a touch-panel display, the at least one first function being displayed in the at least one first touch button to which the at least one first function is assigned, the work information including a state of work which the work vehicle performs; and
changing in accordance with the work information, the at least one first function assigned to the at least one first touch button and at least one first physical button which is provided outside the touch-panel display,
wherein a first identical first function of the at least one first function is assigned to both a first touch button of the at least one first touch button and a first physical button of the at least one first physical button that is positionally aligned with the first touch button, wherein, when the at least one first function assigned to the first touch button and the first physical button is changed, a second identical first function of the at least one first function is assigned to both the first touch button and the first physical button that is positionally aligned with the first touch button, wherein the at least one first touch button includes a plurality of first touch buttons arranged in a first line, the plurality of first touch buttons including the first touch button and a second touch button, wherein the at least one first physical button includes a plurality of first physical buttons arranged in a second line parallel to the first line, the plurality of second physical buttons including the first physical button and a second physical button, wherein the first touch button is aligned with the first physical button in a direction perpendicular the first line, wherein the second touch button is aligned with the second physical button in the direction perpendicular the first line, wherein a third identical first function of the at least one first function is assigned to both the second touch button and the second physical button, and wherein, when the at least one first function assigned to the second touch button and the second physical button is changed, a fourth identical first function of the at least one first function is assigned to both the second touch button and the second physical button.

12. A work vehicle comprising:

a touch-panel display to display at least one first touch button, at least one first function displayed in the at least one first touch button to which the at least one first function is assigned, and work information including a state of work which the work vehicle performs;

at least one first physical button which is provided outside the touch-panel display and to which the at least one first function is assigned; and function changing means for changing the at least one first function assigned to the at least one first touch button and the at least one first physical button in accordance with the work information, wherein a first identical first function of the at least one first function is assigned to both a first touch button of the at least one first touch button and a first physical button of the at least one first physical button that is positionally aligned with the first touch button, wherein, when the function changing means changes the at least one first function assigned to the first touch button and the first physical button, a second identical first function of the at least one first function is assigned to both the first touch button and the first physical button that is positionally aligned with the first touch button, wherein the at least one first touch button includes a plurality of first touch buttons arranged in a first line, the plurality of first touch buttons including the first touch button and a second touch button, wherein the at least one first physical button includes a plurality of first physical buttons arranged in a second line parallel to the first line, the plurality of second physical buttons including the first physical button and a second physical button, wherein the first touch button is aligned with the first physical button in a direction perpendicular the first line, wherein the second touch button is aligned with the second physical button in the direction perpendicular the first line, wherein a third identical first function of the at least one first function is assigned to both the second touch button and the second physical button, and wherein, when the function changing means changes the at least one first function assigned to the second touch button and the second physical button, a fourth identical first function of the at least one first function is assigned to both the second touch button and the second physical button.

\* \* \* \* \*